United States Patent
Park

(10) Patent No.: US 8,582,776 B2
(45) Date of Patent: Nov. 12, 2013

(54) ELECTRONIC MONITORING SYSTEM AND METHOD

(75) Inventor: Manho Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 254 days.

(21) Appl. No.: 12/968,543

(22) Filed: Dec. 15, 2010

(65) Prior Publication Data

US 2011/0145888 A1 Jun. 16, 2011

(30) Foreign Application Priority Data

Dec. 15, 2009 (KR) .................. 10-2009-0124790
Dec. 14, 2010 (KR) .................. 10-2010-0127371

(51) Int. Cl.
*H04L 9/00* (2006.01)

(52) U.S. Cl.
USPC .......................................... 380/277

(58) Field of Classification Search
USPC .......................................... 380/277
See application file for complete search history.

(56) References Cited

U.S. PATENT DOCUMENTS

| | | | | |
|---|---|---|---|---|
| 6,097,798 | A * | 8/2000 | Albers et al. | 379/114.28 |
| 6,229,887 | B1 * | 5/2001 | Albers et al. | 379/219 |
| 6,233,313 | B1 * | 5/2001 | Farris et al. | 379/112.01 |
| 6,504,907 | B1 * | 1/2003 | Farris et al. | 379/35 |
| 2006/0034198 | A1 * | 2/2006 | Makinen et al. | 370/310 |
| 2006/0093135 | A1 | 5/2006 | Fiatal et al. | |

FOREIGN PATENT DOCUMENTS

WO 2004/010649 1/2004

* cited by examiner

*Primary Examiner* — Kambiz Zand
*Assistant Examiner* — Stephen Sanders
(74) *Attorney, Agent, or Firm* — Staas & Halsey LLP

(57) ABSTRACT

An electronic monitoring system located in a second service area when an electronic monitoring target has moved from a first service area having a first authority to the second service area having a second authority starts electronic monitoring for the electronic monitoring target that has moved into the second service area, configures a temporary electronic monitoring authority based on the first authority and the second authority, and executes the electronic monitoring on the electronic monitoring target in the second service area according to the configured temporary electronic monitoring authority.

12 Claims, 6 Drawing Sheets

ELECTRONIC MONITORING SYSTEM AND METHOD

CROSS-REFERENCE TO RELATED APPLICATION

This application claims priority to and the benefit of Korean Patent Application No. 10-2009-0124790 filed in the Korean Intellectual Property Office on Dec. 15, 2009, and Korean Patent Application No. 10-2010-0127371 filed in the Korean Intellectual Property Office on Dec. 14, 2010, the entire contents of which are incorporated herein by reference.

BACKGROUND OF THE INVENTION (a) Field of the Invention

The present invention relates to an electronic monitoring system and method. In particular, the present invention relates to an electronic monitoring system and method between a network operator and a service provider.

(b) Description of the Related Art

Electronic monitoring means that a law enforcement agency, which enforces a law regarding acquiring lawful rights, collects communication information on communication subscribers.

Electronic monitoring for a communication system is executed according to lawful procedures that are established by law. In other words, when the electronic monitoring is needed, specific law enforcement agencies such as police, a prosecutors office, or an electronic monitoring enforcement agency executes the electronic monitoring for specific targets (e.g., specific terminals) that are located in a network that provides specific services, for a specific period according to the review of a legal approval agency such as a court.

In general, the electronic monitoring authority is limited in an area of a legal system of a nation to which the electronic monitoring targets belong.

Therefore, detailed matters of the enforcement of the electronic monitoring are different for each nation. Laws corresponding to each nation generally describe the enforcement of the electronic monitoring under the environments, procedures, and restriction matters where the electronic monitoring is enforced.

When the enforcement of the electronic monitoring is needed while the law enforcement agency progresses an investigation of specific targets, the necessity and justification of the electronic monitoring should be explained to an authority with an indictment or a legal agency that has authority to enforce electronic monitoring. In addition, when the corresponding agency approves the monitoring, it permits the electronic monitoring through approval such as by a warrant.

When the electronic monitoring is permitted, the law enforcement agency gives the electronic monitoring authority to each service provider according to a management interface or procedure of the area corresponding to each service provider. Herein, the service providers includes an access service provider that provides an access service to a user's terminal, to a network operator, to a service provider that provides services to be used by the user, etc.

Thereafter, the service providers transfer intercept related information (IRI) or content of communication (CC) according to the contents of the approved electronic monitoring authority to the law enforcement agency to execute the electronic monitoring services. The electronic monitoring authority that is issued in the form such as a warrant to the service provider includes detailed information on the contents and range of the intercept related information (IRI) or the contents of communication (CC) that can be transferred to the law enforcement agency.

In general, the electronic monitoring authority includes the information on the electronic monitoring target that includes a period that the electronic monitoring is to be executed, a name, a telephone number, a terminal identification number of a person that is the electronic monitoring target, etc. Further, the electronic monitoring authority can be modified in various restriction conditions and application forms under the legal area of the corresponding nation due to different law enforcing periods and different investigations.

The electronic monitoring system for executing electronic monitoring supports electronic monitoring under the assumption that the electronic monitoring authority for all the service areas is matched and there is no lawful problem, when the user is currently moved to other service areas by methods such as a roaming, a vertical handover, etc.

However, when the electronic monitoring authority for each electronic monitoring area is different, the electronic monitoring system cannot continuously execute the electronic monitoring due to different authority of two areas when the electronic monitoring targets belonging to one electronic monitoring area are moved to other electronic monitoring areas.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a system and method for continuously executing electronic monitoring although electronic monitoring authority for each electronic monitoring area is different when electronic monitoring targets belonging to one electronic monitoring area are moved to other electronic monitoring areas.

In order to achieve the above objects, an exemplary embodiment according to the present invention provides a method for performing electronic monitoring on an electronic monitoring target when the electronic monitoring target has moved from a first service area having a first authority to a second service area having a second authority by an electronic monitoring system located in the second service area, the method including:

receiving an electronic monitoring request on the electronic monitoring target; and executing the electronic monitoring on the electronic monitoring target in the second service area based on the first authority and the second authority responding to the electronic monitoring request.

Another exemplary embodiment according to the present invention provides a method for allowing a first electronic monitoring system to execute electronic monitoring on an electronic monitoring target that exists in a first service area to which the first electronic monitoring system belongs, the method including:

executing the electronic monitoring on an electronic monitoring target that exist in the first service area according to the corresponding electronic monitoring authority; confirming whether the direct electronic monitoring is executed according to the electronic monitoring authority; and when the direct electronic monitoring is impossible, transmitting contents of communication of the electronic monitoring target to a second electronic monitoring systems that are located in second service areas that are different from the first service area to transmit the electronic monitoring results to a external law enforcement agency system through the second electronic monitoring systems.

Yet another exemplary embodiment according to the present invention provides an electronic monitoring method of an electronic monitoring system, the method including;

executing electronic monitoring on an electronic monitoring target in a second service area of the electronic monitoring system when the electronic monitoring target moves from a first service are to the second service area: temporally storing a result of the electronic monitoring execution; and waiting for an authentication message for the execution of the electronic monitoring on the electronic monitoring target in the second service area.

DETAILED DESCRIPTION OF THE EMBODIMENTS

Figure 1:
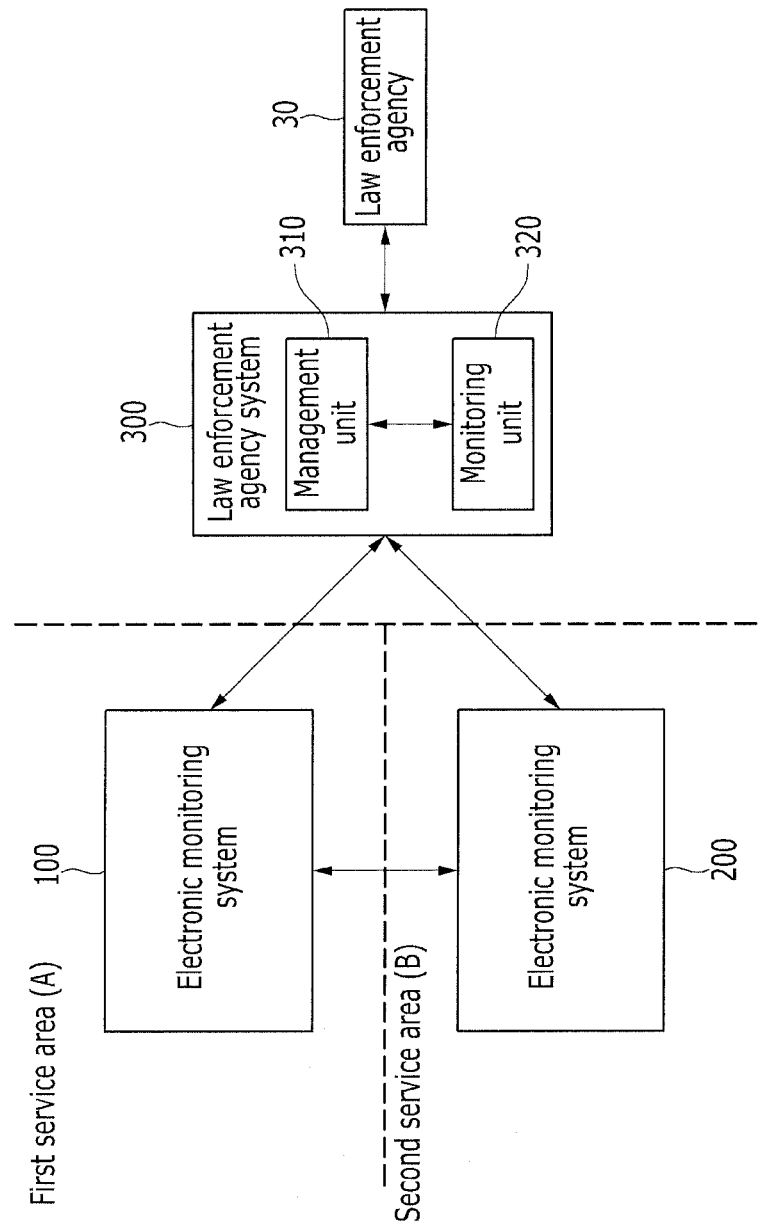
FIG. 1 is a diagram schematically showing an environment where the electronic monitoring system according to the exemplary embodiment of the present invention is applied.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising" will be understood to imply the inclusion of stated elements but not the exclusion of any other elements.

Hereinafter, an electronic monitoring system and method according to an exemplary embodiment of the present invention will be described with reference to the accompanying drawing.

FIG. 1 is a diagram schematically showing an environment where the electronic monitoring system according to the exemplary embodiment of the present invention is applied.

First, the electronic monitoring according to the exemplary embodiment of the present invention is to collect content of communication (hereinafter referred to as "electronic monitoring information") and intercept related information (hereinafter referred to as "electronic monitoring related information") of communication subscribers, that is, electronic monitoring targets in a law enforcement agency that acquires a lawful right. Herein, the electronic monitoring information includes contents that the electronic monitoring targets communicates with other targets, for example, communication contents, transmission packet contents, etc. In addition, the electronic monitoring related information is information or intercept related information that is provided by a service provider (not shown). For example, the electronic monitoring related information includes information such as a calling number, a called number, an access IP, an access URL, a communication start time, a communication termination time, a user ID, etc.

The electronic monitoring system that collects the information is located in a service area to which the communication subscribers, that is, the electronic monitoring targets, belong. Herein, the electronic monitoring target is a target for which electronic monitoring is requested by a court or a corresponding law management agency for a specific objective such as a criminal investigation in the law enforcement agency such as police or a court.

The electronic monitoring target related information, that is, the electronic monitoring target information, includes the name, ID, registration number, address, etc., of the electronic monitoring target.

Referring to FIG. 1, each of the plurality of electronic monitoring systems 100 and 200 is linked with a law enforcement agency system 300 of a law enforcement agency 30 side, and executes the electronic monitoring on the electronic monitoring target that exists in the service area belonging thereto. Herein, the service area is an area that provides services to the electronic monitoring target through a specific network.

When the electronic monitoring for the specific target is needed, the law enforcement agency 30 requests permission for the electronic monitoring target that requires electronic monitoring from the court or the corresponding law management agency to acquire the electronic monitoring authority and give the acquired electronic monitoring authority to the service provider. Herein, the electronic monitoring authority includes the electronic monitoring target information, the range of the electronic monitoring related information corresponding to the electronic monitoring target, the range of the electronic monitoring information corresponding to the electronic monitoring target, the service range corresponding to the electronic monitoring target, whether or not to provide position information of the electronic monitoring target, the period of the electronic monitoring, etc.

In addition, the service provider provides services to the electronic monitoring target through the corresponding network, and includes an access service provider that provides an access service for the corresponding terminal to the electronic monitoring target, the network operator, the service provider that provides services to be used by the electronic monitoring target, etc. In addition, the law enforcement agency 30 registers the acquired electronic monitoring authority in the law enforcement agency system 300. The law enforcement agency 30 according to the exemplary embodiment of the present invention may be the police or a prosecutor, and is not limited thereto.

The law enforcement agency system 300 registers the electronic monitoring authority acquired in the law enforcement agency 30 and requests the electronic monitoring for the plurality of electronic monitoring systems 100 and 200 based thereon. To this end, the law enforcement agency system 300 includes a management unit 310 and a monitoring unit 320.

The management unit 310 registers the electronic monitoring authority that is transmitted from the law enforcement agency 30, and requests the electronic monitoring for the electronic monitoring target that is located in the corresponding service area based on the registered electronic monitoring authority from the electronic monitoring system.

In detail, the management unit 310 receives the electronic monitoring request from the law enforcement agency 30, and requests the electronic monitoring for the electronic monitoring target that is located in the service area corresponding to the request, from the electronic monitoring system. At this time, the management unit 310 provides the corresponding electronic monitoring authority to the electronic monitoring system and requests the electronic monitoring for the electronic monitoring target that is located in the corresponding service area based on the electronic monitoring authority.

The monitoring unit 320 receives the electronic monitoring related information or the electronic monitoring information from the individual electronic monitoring transmitting unit of the plurality of electronic monitoring systems 100 and 200 and databases, and manages the information. In addition, the monitoring unit 320 is controlled by the management unit 310 and provides database information to the law enforcement agency 30 when the information is requested.

The exemplary embodiment of the present invention describes the electronic monitoring method according to an exemplary embodiment of the present invention based on two electronic monitoring systems that are located in different service areas, but is not limited thereto.

Next, an electronic monitoring system according to an exemplary embodiment of the present invention will be described in detail with reference to FIG. 2.

Figure 2:
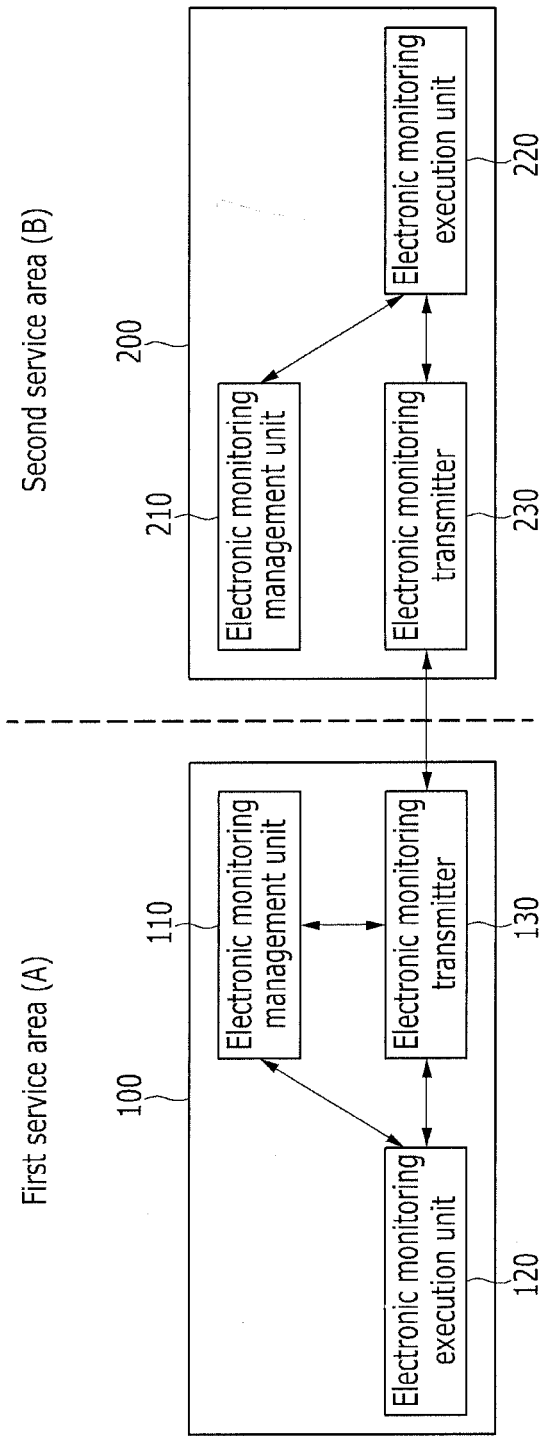
FIG. 2 is a diagram schematically showing an electronic monitoring system according to the exemplary embodiment of the present invention.

FIG. 2 is a diagram schematically showing an electronic monitoring system according to the exemplary embodiment of the present invention.

Referring to FIG. 2, the first electronic monitoring system 100 and the second electronic monitoring system 200 are respectively located in the first service area (A) and the second service area (B) to execute the electronic monitoring on the electronic monitoring target of the corresponding service area.

To this end, the first electronic monitoring system 100 includes a first electronic monitoring management unit 110, a first electronic monitoring execution unit 120, and a first electronic monitoring transmitter 130, and the second electronic monitoring system 200 includes a second monitoring management unit 210, a second electronic monitoring execution unit 220, and a second electronic monitoring transmitter 230.

Hereinafter, components included in the first electronic monitoring system 100 will be described. In addition, components included in the second electronic monitoring system 200 execute the same role as the components included in the first electronic monitoring system 100, and therefore the detailed description thereof will be omitted.

The first electronic monitoring management unit 110 receives the electronic monitoring request from the law enforcement agency system 300 and starts the electronic monitoring for the electronic monitoring targets that exist in the first service area A. At this time, the first electronic monitoring management unit 110 requests the service information for the electronic monitoring targets (e.g., terminal identification number, allocation IP, user ID, etc.) from the corresponding service manager according to the electronic monitoring request, and instructs the first electronic monitoring execution unit 120 of the electronic monitoring mission for the corresponding electronic monitoring target according to the electronic monitoring target information corresponding to the request.

In addition, the first electronic monitoring management unit 110 confirms whether the electronic monitoring target moves to a new service area during the electronic monitoring. Herein, to confirm whether the electronic monitoring target moves to a new service area, methods known to those skilled in the art can be used, and therefore the detailed description thereof will be omitted herein.

When it is determined that the electronic monitoring target has moved to a new service area, the first electronic monitoring management unit 110 transmits information that the electronic monitoring target moving to a second service area is the electronic monitoring target in the first service area and the information on the first electronic monitoring authority that is the electronic monitoring range applied to the electronic monitoring target to the second electronic monitoring management unit 210 belonging to the new service area. In other words, the first electronic monitoring management unit 110 requests continuous electronic monitoring for the currently applied electronic monitoring activity from the second electronic monitoring management unit 210.

At this time, the second electronic monitoring management unit 210 compares the second electronic monitoring authority and the first electronic monitoring authority that can be applied to the electronic monitoring target in the second service area to determine the application range of the electronic monitoring authority of the electronic monitoring target based on the comparison result.

In detail, the first electronic monitoring management unit 110 executes the electronic monitoring on the electronic monitoring target in the electronic monitoring range that permits the electronic monitoring during the predetermined electronic monitoring period based on the electronic monitoring target information.

The first electronic monitoring management unit 110 confirms that the electronic monitoring target has moved from the first service area A to the second service area B during the electronic monitoring.

When the movement of the electronic monitoring target is confirmed, the first electronic monitoring management unit 110 informs the information regarding the electronic monitoring target in the first service area A and the electronic monitoring authority that is applied in the electronic monitoring target. Next, when the transmission of information is completed, the first electronic monitoring management unit 110 terminates the electronic monitoring activity in the area applied to the corresponding electronic monitoring target.

Then, the second electronic monitoring management unit 210 compares the first electronic monitoring authority and the second electronic monitoring authority that respectively correspond to the first and second service areas A and B.

In detail, the second electronic monitoring management unit 210 determines whether the ranges of the first electronic monitoring authority and the second electronic monitoring authority, that is, the lists for executing the electronic monitoring on the electronic monitoring target, are the same.

For example, the case where the first electronic monitoring authority includes the electronic monitoring target, the identification number of the electronic monitoring target, the call history, and the call contents, and the second electronic monitoring authority includes the electronic monitoring target, the identification code of the electronic monitoring subject, and the call history, will be described.

At this time, the second electronic monitoring management unit 210 determines that the electronic monitoring authorities are different when the lists of the first electronic monitoring authority and the second electronic monitoring authority, that is, the electronic monitoring authorities, are not the same. Further, the second electronic monitoring management unit 210 determines that the electronic monitoring authorities are the same when the lists of the first electronic monitoring authority and the second electronic monitoring authority are the same.

When the electronic monitoring authorities are the same, the second electronic monitoring management unit 210 applies the electronic monitoring authority to the electronic monitoring target newly entered into the second service area B to execute the electronic monitoring.

On the other hand, when the electronic monitoring authorities are not the same, the second electronic monitoring system 200 transfers the fact of an authority mismatch to the law enforcement agency system 300 of the law enforcement agency 30 side and requests corresponding processing. For example, the case where the electronic monitoring authorities are not the same includes the case where the electronic monitoring authority for the electronic monitoring target does not exist in the second service area B or the case where the electronic monitoring authority of the second service area B is smaller than the electronic monitoring authority of the first service area A, but excludes the case where the second electronic monitoring authority is greater than the first electronic monitoring authority.

While the second electronic monitoring system 200 informs the fact of the authority mismatch to the law enforcement agency system 300 and confirms it, it executes the electronic monitoring using both the electronic monitoring authority of the first service area A and the electronic monitoring authority of the second service area B.

The first electronic monitoring execution unit 120 receives the electronic monitoring target information from the service provider that provides services to the first service area A. In addition, the first electronic monitoring execution unit 120 collects and transmits the electronic monitoring related information or the electronic monitoring information including the electronic monitoring activity from the first electronic monitoring management unit 110 for the electronic monitoring target matching the transmitted electronic monitoring target information. Herein, the electronic monitoring target information includes information on an electronic monitoring target related name, ID, etc., that are owned by the service provider providing services to the corresponding service area, and the related information includes a calling number, a called number, an access IP, an access URL, a communication start time, a communication termination time, and so on. The electronic monitoring information includes call contents, transmission packet contents, etc., as the communication contents that are generated for the electronic monitoring target.

The first electronic monitoring transmitter 130 receives the electronic monitoring information or the electronic monitoring related information from the first electronic monitoring execution unit 120, and collects and analyzes it and transmits the information to the monitoring unit 320 of the law enforcement agency system 300 according to the command of the first electronic monitoring management unit 110.

Next, a method for allowing the electronic monitoring system according to the exemplary embodiment of the present invention to start the electronic monitoring will be described in detail with reference to FIG. 3.

Figure 3:
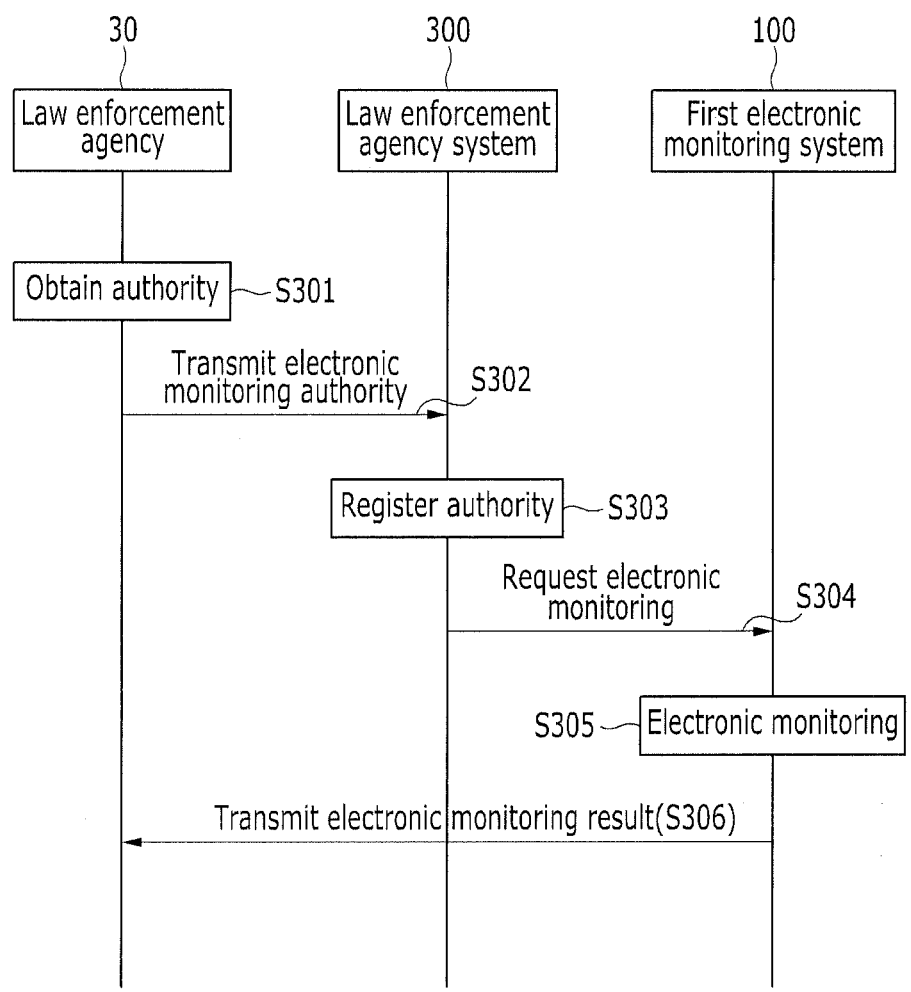
FIG. 3 is a flowchart showing a method for allowing the electronic monitoring system according to the exemplary embodiment of the present invention to start the electronic monitoring.

FIG. 3 is a flowchart showing a method for allowing the electronic monitoring system according to the exemplary embodiment of the present invention to start the electronic monitoring.

The environment where the electronic monitoring method according to the exemplary embodiment of the present invention is applied includes the law enforcement agency 30, the law enforcement agency system 300, and a plurality of electronic monitoring systems.

Hereinafter, a method for allowing the first electronic monitoring system 100 of the plurality of electronic monitoring systems to start the electronic monitoring will be described.

Referring to FIG. 3, when the law enforcement agency 30 needs the electronic monitoring for a specific target, it obtains electronic monitoring authority for the electronic monitoring target that needs electronic monitoring from the corresponding law management agency (S301).

The law enforcement agency 30 transmits the obtained electronic monitoring authority to the law enforcement agency system 300 (S302).

The law enforcement agency system 300 registers the transmitted electronic monitoring authority (S303) and requests the electronic monitoring from the first electronic monitoring system 100 based thereon (S304). At this time, the electronic monitoring authority corresponding to the first electronic monitoring system 100 is the first electronic monitoring authority and includes the electronic monitoring target information, the electronic monitoring related information, the electronic monitoring information, the service range of the electronic monitoring target, the period of the electronic monitoring, etc. The first electronic monitoring system 100 executes the electronic monitoring on the electronic monitoring target that is located in the corresponding first service area (S305).

In detail, the electronic monitoring for the electronic monitoring target that is located in the first service area is requested from the first electronic monitoring system 100. At this time, the first electronic monitoring system 100 receives and registers the first electronic monitoring authority and the electronic monitoring target information that correspond to the first service area A. Herein, the electronic monitoring target information includes the name, ID, registration number, telephone number, address, etc., of the electronic monitoring target.

Next, the first electronic monitoring system 100 uses the information on the electronic monitoring target and searches the electronic monitoring target that is located in the first service area. The first electronic monitoring system 100 executes the electronic monitoring on the searched electronic monitoring target based on the first electronic monitoring authority.

The first electronic monitoring system 100 executes the electronic monitoring and then transmits the electronic monitoring results to the law enforcement agency 30 through the law enforcement agency system 300 (S306).

For example, when the first electronic monitoring authority includes only the electronic monitoring target information and the electronic monitoring related information, the first electronic monitoring system 100 divides only the electronic monitoring target information such as ID and the electronic monitoring related information such as access time and transmits it to the law enforcement agency system 300, excluding the communication information such as the calling contents or the transmission packet contents among the collected electronic monitoring information.

Next, the electronic monitoring method by the electronic monitoring system according to the exemplary embodiment of the present invention will be described in detail with reference to FIG. 4 in terms of the first electronic monitoring system 100 that executes the electronic monitoring on the electronic monitoring target that exists in the first service area A.

Figure 4:
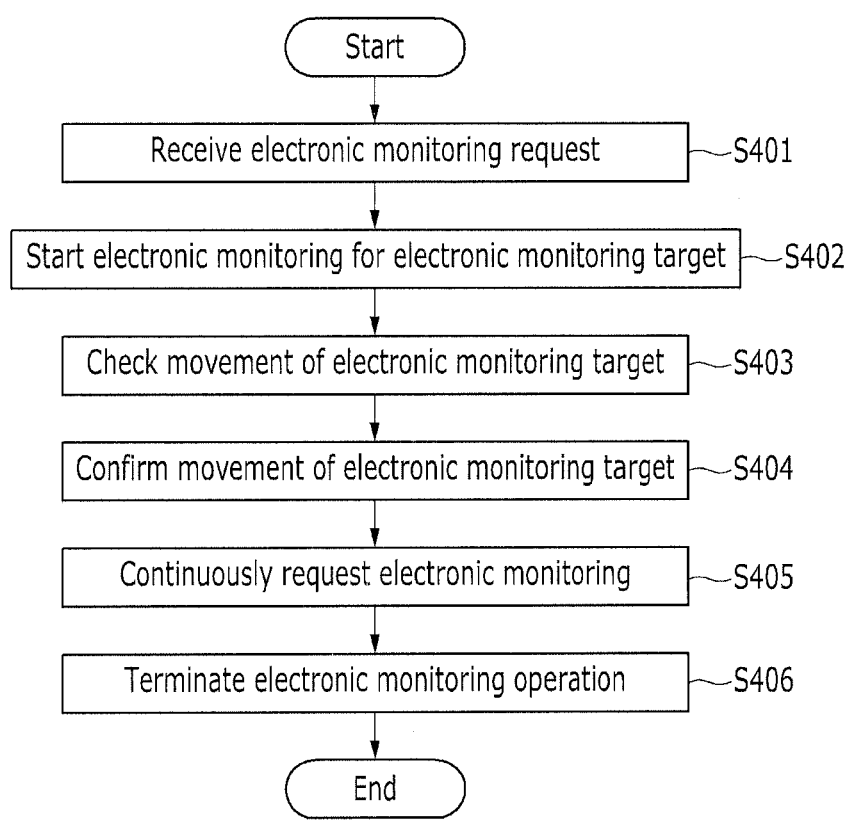
FIG. 4 is a flowchart showing a method for executing electronic monitoring on an electronic monitoring target by the electronic monitoring system according to an exemplary embodiment of the present invention.

FIG. 4 is a flowchart showing a method for executing electronic monitoring on an electronic monitoring target by the electronic monitoring system according to an exemplary embodiment of the present invention.

First, the environment where the electronic monitoring method according to the exemplary embodiment of the present invention is applied includes a plurality of service areas. At this time, each of the plurality of service areas is an area that provides the specific services to the electronic monitoring target through the corresponding network.

For example, the first electronic monitoring system 100 executes the electronic monitoring on the electronic monitoring target that is located in the first service area A to which the first electronic monitoring system 100 belongs.

Referring to FIG. 4, the first electronic monitoring system 100 receives the electronic monitoring request from the law enforcement agency system 300 (S401). At this time, the first electronic monitoring system 100 requests the corresponding service information (e.g., terminal identification number, allocation IP, user ID, etc.) corresponding to the electronic monitoring target from the corresponding service manager according to the electronic monitoring request.

The first electronic monitoring system 100 starts the electronic monitoring for the electronic monitoring target that exists in the first service area A (S402).

During the electronic monitoring, the first electronic monitoring system 100 checks whether the electronic monitoring target has moved from the first service area A to the second service area B that is new service area (S403). The electronic monitoring target can be moved to a new service area by a method such as roaming or a vertical handover, but is not limited thereto. In addition, the method that checks whether the electronic monitoring target has moved to a new service area can be a method known to those skilled in the art, so the detailed description of the checking method will be omitted.

The first electronic monitoring system 100 executes the following operation when it is confirmed that the electronic monitoring target has moved to the second service area B that is a new service area (S404).

When it is confirmed that the electronic monitoring target has moved, the first electronic monitoring system 100 transmits the information that the electronic monitoring target that has moved to the second service area is the electronic monitoring target from the first service area and the information on the first electronic monitoring authority that is the electronic monitoring range applied to the electronic monitoring target, to the second electronic monitoring system 200 belonging to the new service area.

In other words, the first electronic monitoring system 100 requests the continuous electronic monitoring for the currently applied electronic monitoring activity from the second electronic monitoring management unit 210 (S405).

At this time, the second electronic monitoring management unit 210 compares the second electronic monitoring authority that can be applied to the electronic monitoring target in the second service area with the first electronic monitoring authority and determines the application range of the electronic monitoring target based on the comparison result.

After the continuous electronic monitoring request is transmitted to the second electronic monitoring management unit 210, the first electronic monitoring system 100 terminates the electronic monitoring operation for the corresponding electronic monitoring target (S406).

Next, for when the electronic monitoring target has moved from the first service area A to the second service area B, the second electronic monitoring system 200 that executes the electronic monitoring on the electronic monitoring target that exists in the second service area B will be described in detail with reference to FIG. 5.

Figure 5:
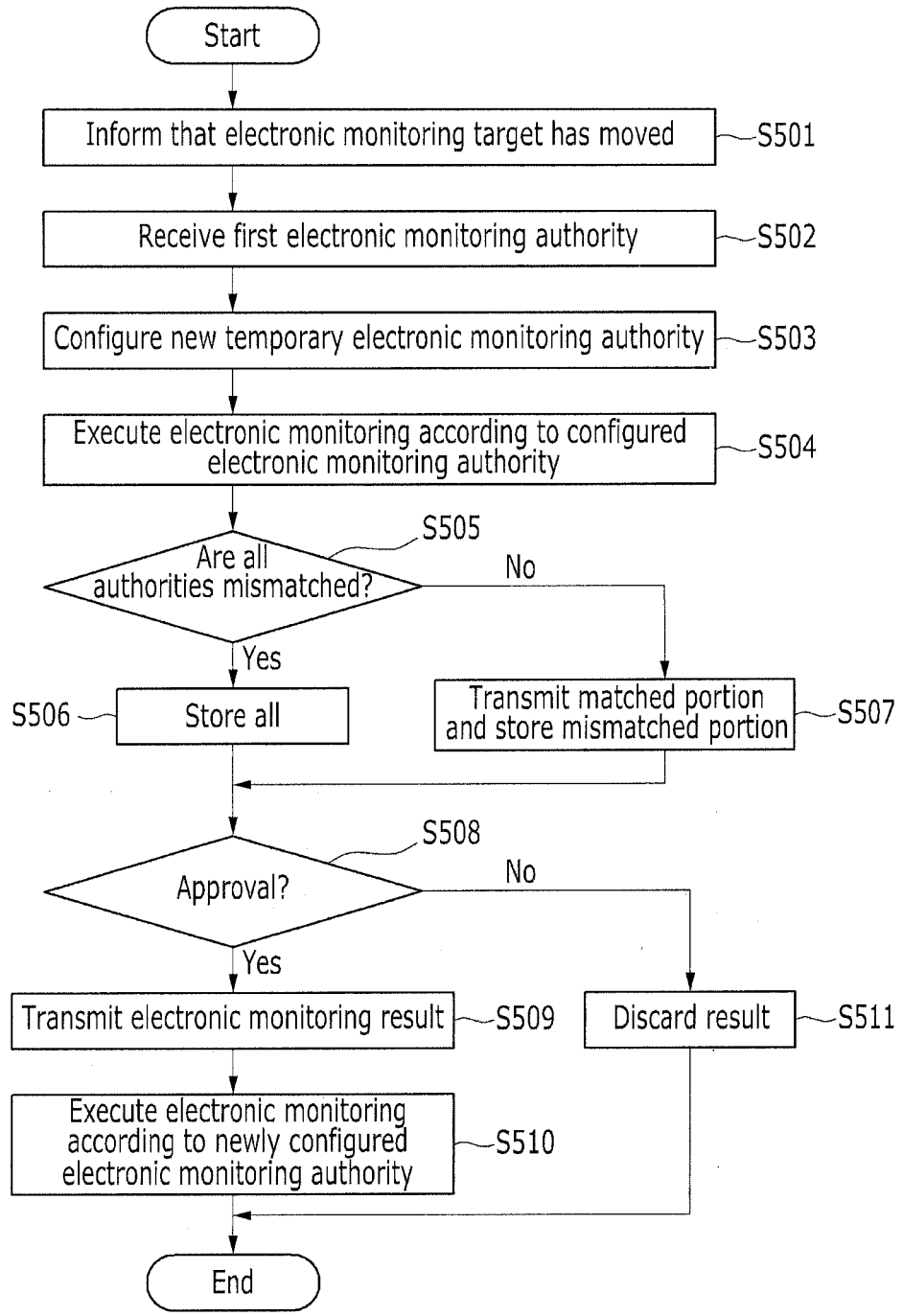
FIG. 5 is a flowchart showing a method for executing electronic monitoring on an electronic monitoring target that has moved from other service areas by an electronic monitoring system according to an exemplary embodiment of the present invention.

FIG. 5 is a flowchart showing a method for executing electronic monitoring on an electronic monitoring target that has moved from other service areas by an electronic monitoring system according to an exemplary embodiment of the present invention.

First, the second electronic monitoring system 200 executes the electronic monitoring on the electronic monitoring target that exists in the second service area B belonging to the second electronic monitoring system 200 according to the second electronic monitoring authority that corresponds to the second service area B transmitted from the law enforcement agency system 300. At this time, the electronic monitoring target has moved from the first service area A to the second service area B.

Referring to FIG. 5, the second electronic monitoring system 200 is informed that the electronic monitoring target has moved from the first service area A to its own service area, that is, the second service area B (S501).

The second electronic monitoring system 200 receives the information that the electronic monitoring target that has moved to the second service area is the electronic monitoring target from the first service area and the information on the first electronic monitoring authority that is the electronic monitoring range applied to the electronic monitoring target (S502).

The second electronic monitoring system 200 compares the first electronic monitoring authority with the second electronic monitoring authority and configures a new temporary electronic monitoring authority according to the comparison result (S503). In detail, the second electronic monitoring system 200 determines whether the first electronic monitoring authority and the second electronic monitoring authority match each other.

When the authorities are mismatched, the second electronic monitoring system 200 configures the temporary electronic monitoring authority that includes the electronic monitoring authority of the first service area A and the electronic monitoring authority of the second service area B.

Next, the second electronic monitoring system 200 executes the electronic monitoring according to the temporary electronic monitoring authority (S504). Herein, the temporary electronic monitoring authority includes the electronic monitoring authority of the first service area A and the electronic monitoring authority of the second service area B.

The second electronic monitoring system 200 transmits the electronic monitoring results obtained by executing the electronic monitoring according to the temporary electronic monitoring authority to the law enforcement agency system 300. At this time, the second electronic monitoring system 200 transmits the electronic monitoring results obtained by executing according to the first electronic monitoring authority and the second electronic monitoring authority that match each other, and processes the remaining electronic monitoring results obtained by executing the electronic monitoring according to the mismatched authority according to the confirmation of the mismatched authority.

For this purpose, the second electronic monitoring system 200 determines whether all or a part of the first electronic monitoring authority and the second electronic monitoring authority is matched or not (S505).

When all of the first electronic monitoring authority and the second electronic monitoring authority is mismatched, the second electronic monitoring system 200 temporarily stores the entire result obtained by executing the electronic monitoring on the electronic monitoring target in the second service area B according to the temporary electronic monitoring authority, and waits for the confirmation of the electronic monitoring authority (S506).

When the first electronic monitoring authority and the second electronic monitoring authority partially mismatch each other, the second electronic monitoring system 200 extracts electronic monitoring results corresponding to a portion in which the first electronic monitoring authority and the second electronic monitoring authority is matched with each other from among the entire results obtained by executing the electronic monitoring on the electronic monitoring target in the second service area B according to the temporary electronic monitoring authority and transmits it to the law enforcement agency system 300. Further, the second electronic monitoring system 200 extracts and stores electronic monitoring results corresponding to a portion in which the first electronic monitoring authority and the second electronic monitoring authority is mismatched from among the entire results (S507).

At this time, the second electronic monitoring system 200 temporarily stores the results obtained by executing the electronic monitoring on the electronic monitoring target according to the electronic monitoring authority except for the portion corresponding to the second electronic monitoring authority in the newly configured electronic monitoring authority, and waits for the confirmation of the electronic monitoring authority.

The second electronic monitoring system 200 applies the portion of the first electronic monitoring authority that does not include the second electronic monitoring authority to the electronic monitoring target that has moved to the second service area B to temporarily store the results obtained by executing the electronic monitoring until whether the electronic monitoring is executed or not is confirmed from the law enforcement agency system 300.

The second electronic monitoring system 200 determines the approval or not of the execution of the electronic monitoring according to the electronic monitoring authority that is newly configured by the low enforcement agency system 300 (S508).

When the newly configured electronic monitoring authority is approved, the second electronic monitoring system 200 transmits the results obtained by executing the electronic monitoring to the law enforcement agency system 300, according to the first electronic monitoring authority, except for the second electronic monitoring authority among the temporarily stored electronic monitoring results (S509). Next, the second electronic monitoring system 200 applies the newly configured electronic monitoring authority to the electronic monitoring authority to execute the electronic monitoring (S510).

When the newly configured electronic monitoring authority is not approved, the second electronic monitoring system 200 discards the temporarily stored electronic monitoring results (S511).

As described, the second electronic monitoring system 200 temporally stores the electronic monitoring results until an authentication message for the execution of the electron monitoring on the electronic monitoring target in the second service area B. In addition, the second electronic monitoring system 200 transmits the temporally stored electronic monitoring results to the law enforcement agency system 300 when receiving a positive authentication message that approves the execution of the electronic monitoring on the electronic monitoring target in the second service area B and discards the temporally stored electronic monitoring results when receiving a negative authentication message that does not approves the execution of the electronic monitoring on the electronic monitoring target in the second service area B to thereby guarantee continuity in electronic monitoring on the electronic monitoring target. In this case, when the second electronic monitoring system 200 receives an authentication message that partially approves and partially disapproves the execution of the electronic monitoring on the electronic monitoring target in the second service area B, the second electronic monitoring system 200 can transmit a portion corresponding to an allowable range among the temporally stored electronic monitoring results to the law enforcement agency system 300 and discard a portion corresponding an unallowable range among the temporally stored electronic monitoring results.

According to another exemplary embodiment, a second electronic monitoring system 200 predetermines a maximum delay period for receiving an authentication message, and considers the execution of the electronic monitoring on the electronic monitoring target in a second service area B to be disapproved when the authentication message is not received within the maximum delay period (that is, authentication message receiving is timed out).

On the contrary to the another exemplary embodiment, the second electronic monitoring system 200 may consider the execution of the electronic monitoring on the electronic monitoring target in the second service area B to be approved when the authentication message is not received within the maximum delay period.

Next, for when the communication of the electronic monitoring system and the law enforcement agency system 300 is impossible or is not smoothly executed, or the execution of the required electronic monitoring function is impossible due to the problems of the capacity and performance of the current electronic monitoring system, the electronic monitoring method will be described in detail with reference to FIG. 6.

Figure 6:
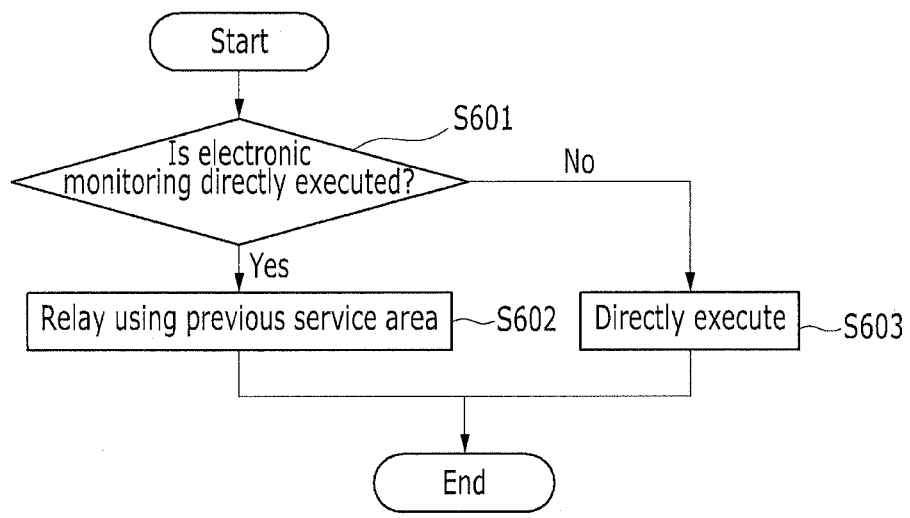
FIG. 6 is a flowchart showing the electronic monitoring method between the electronic monitoring system and the law enforcement agency system according to the exemplary embodiment of the present invention.

FIG. 6 is a flowchart showing the electronic monitoring method between the electronic monitoring system and the law enforcement agency system according to the exemplary embodiment of the present invention.

First, when the electronic monitoring target according to the exemplary embodiment of the present invention has moved from the first service area A to the second service area B, the second electronic monitoring system 200, which is located in the second service area B, executes the electronic monitoring according to the requested electronic monitoring authority and transmits the results to the law enforcement agency system 300.

At this time, the second electronic monitoring system 200 confirms whether the direct electronic monitoring can be executed according to the required electronic monitoring authority (S601).

When the direct electronic monitoring is impossible, the second electronic monitoring system 200 transmits the communication information of the corresponding electronic monitoring target to the first electronic monitoring system 100 that is located in the first service area A before the electronic monitoring target has moved to the second service area B. The case where the direct electronic monitoring is impossible includes, for example, the case where the direct communication is impossible or the case where the execution of the required electronic monitoring is impossible due to the problem of the capacity, performance, etc., of the current electronic monitoring system, and so on.

Next, the first electronic monitoring system 100, which receives the communication information, relays the communication information and transmits it to the law enforcement agency system 300 (S602).

When the direct electronic monitoring is possible, the second electronic monitoring system 200 directly executes the electronic monitoring on the electronic monitoring target and then transmits it to the law enforcement agency system 300 (S603).

While each of the plurality of electronic monitoring systems 100 and 200 according to the exemplary embodiment of the present invention communicate with the law enforcement agency system 300 to execute the electronic monitoring work, the case where the transmission is not smooth or the execution of the newly requested electronic monitoring authority is impossible due to several conditions can occur.

At this time, the second electronic monitoring system 200 relays and executes the electronic monitoring function through the first electronic monitoring system 100 that is located in the first service area A before the electronic monitoring target has moved to the second service area B, thereby making it possible to continuously execute the electronic monitoring.

Thereby, the electronic monitoring system and method according to the exemplary embodiment of the present invention overcome the electronic monitoring vacuum that occurs by the difference of the electronic monitoring authorities that are each applied to the previous service area and the new service area when the electronic monitoring target has moved to the new service area, thereby making it possible to continuously execute the electronic monitoring.

According to the exemplary embodiment of the present invention, the electronic monitoring authority corresponding to a new service area is acquired, and an electronic monitoring vacuum until the previous electronic monitoring authority is modified is overcome by moving the electronic monitoring targets from the current service area to the new service area, thereby making it possible to effectively execute the electronic monitoring. Therefore, the electronic monitoring discontinuity that can be caused when the electronic monitoring authority for each electronic monitoring area is different can be solved, that is, the electronic monitoring can be continuously executed.

The above-mentioned exemplary embodiments of the present invention are not embodied only by an apparatus and method. Alternatively, the above-mentioned exemplary embodiments may be embodied by a program performing functions that correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for performing electronic monitoring on an electronic monitoring target when the electronic monitoring target has moved from a first service area having a first authority to a second service area having a second authority by an electronic monitoring system located in the second service area, the method comprising:

receiving an electronic monitoring request on the electronic monitoring target;

executing, by way of one or more processors, the electronic monitoring on the electronic monitoring target in the second service area based on the first authority and the second authority responding to the electronic monitoring request, wherein the first authority and the second authority are different; and transferring an electronic monitoring result corresponding to a portion that the first authority and the second authority agree with each other among all of all of electronic monitoring results acquired by executing the electronic monitoring to an external law enforcement agency system and temporarily storing an electronic monitoring result corresponding to a portion that the first authority and the second authority disagree with each other among the electronic monitoring results, when the first authority is different from the second authority.

2. The method of claim 1, wherein each of the first authority and the second authority includes at least one of electronic monitoring target information, electronic monitoring related information, electronic monitoring information, a service range of an electronic monitoring target, and a period of electronic monitoring, the electronic monitoring target information includes at least one of the name, ID, registration number, telephone number, and address of the electronic monitoring target, the electronic monitoring related information is information that is generated when the electronic monitoring target performs communication, and the electronic monitoring information includes communication contents between the electronic monitoring target and other targets.

3. The method of claim 2, further comprising configuring a temporary electronic monitoring authority including both of the first authority and the second authority, wherein the executing the electronic monitoring executes the electronic monitoring on an electronic monitoring target in the second service area based on the temporary electronic monitoring authority.

4. The method of claim 1, wherein the transferring the electronic monitoring result includes transferring all of the electronic monitoring results to the law enforcement agency system when the first authority and the second authority are the same.

5. The method of claim 4, wherein the transferring the electronic monitoring results includes when authority on the electronic monitoring target is approved, transmitting the temporarily stored electronic monitoring result, and when authority on the electronic monitoring target is not approved, deleting the temporarily stored electronic monitoring results.

6. The method of claim 1, wherein the executing the electronic monitoring includes confirming whether the electronic monitoring system located in the second service area can execute the direct electronic monitoring, when it is confirmed that the electronic monitoring system cannot execute the direct electronic monitoring, transmitting contents of the communication on the electronic monitoring target to another electronic monitoring system that is located in a different service area from the second service area to transmit the electronic monitoring results to the law enforcement agency system through the another electronic monitoring system, and directly executing the electronic monitoring for the electronic monitoring target when it is confirmed the electronic monitoring system can execute the direct electronic monitoring.

7. A method for allowing a first electronic monitoring system to execute electronic monitoring on an electronic monitoring target that exists in a first service area having a first authority to which the first electronic monitoring system belongs, the method comprising:

executing, by way of one or more processors, the electronic monitoring on an electronic monitoring target that exist in the first service area according to the corresponding electronic monitoring authority;

confirming whether the direct electronic monitoring is executed according to the electronic monitoring authority; and when the direct electronic monitoring is impossible, transmitting contents of communication of the electronic monitoring target to a second electronic monitoring system that is located in a second service area having a second authority that is different from the first service area to transmit the electronic monitoring results to a external law enforcement agency system through the second electronic monitoring system, wherein an electronic monitoring result corresponding to a portion that the first authority and the second authority agree with each other among all of electronic monitoring results acquired by executing the electronic monitoring are transmitted to the external law enforcement agency system when the first authority is different from the second authority.

8. The method of claim 7, further comprising:

directly executing the electronic monitoring for the electronic monitoring target when the electronic monitoring is to be directly executed; and directly transmitting a result of the execution of the electronic monitoring to the external law enforcement agency system.

9. An electronic monitoring method of an electronic monitoring system, comprising;

executing, by way of one or more processors, electronic monitoring on an electronic monitoring target in a second service area of the electronic monitoring system when the electronic monitoring target moves from a first service area having a first authority to the second service area having a second authority:

temporarily storing a portion that the first authority and the second authority disagree with each other among results of the electronic monitoring execution and transmitting a portion that the first authority and the second authority agree with each other among results of the electronic monitoring execution, when the first authority is different from the second authority; and waiting for an authentication message for the execution of the electronic monitoring on the electronic monitoring target in the second service area, wherein a first authority of the first service area and a second authority of the second service area are different.

10. The method of claim 9, further comprising:

transmitting the temporarily stored result of the electronic monitoring execution when receiving a positive authentication message for the electronic monitoring execution.

11. The method of claim 9, further comprising:

discarding the temporarily stored result of the electronic monitoring execution when receiving a negative authentication message for the electronic monitoring execution.

12. The method of claim 9, further comprising:

discarding the temporarily stored result of the electronic monitoring execution when the authentication message is not received with a maximum delay period.

* * * * *